J. PETERSON.
HOLD OPEN DEVICE FOR DOORS.
APPLICATION FILED OCT. 23, 1915.
1,170,491.
Patented Feb. 1, 1916.
2 SHEETS—SHEET 1.
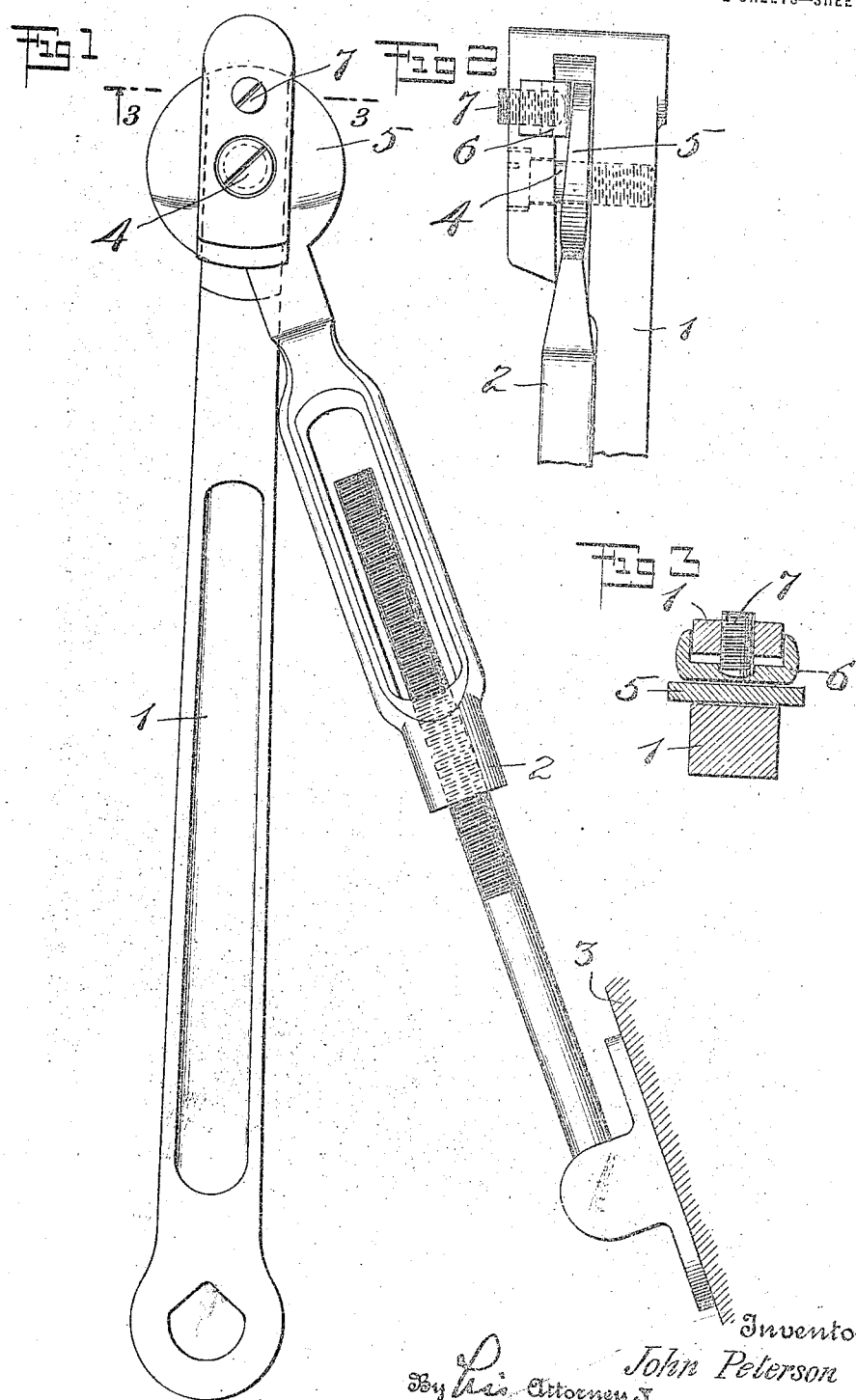
Inventor
John Peterson
By his Attorneys

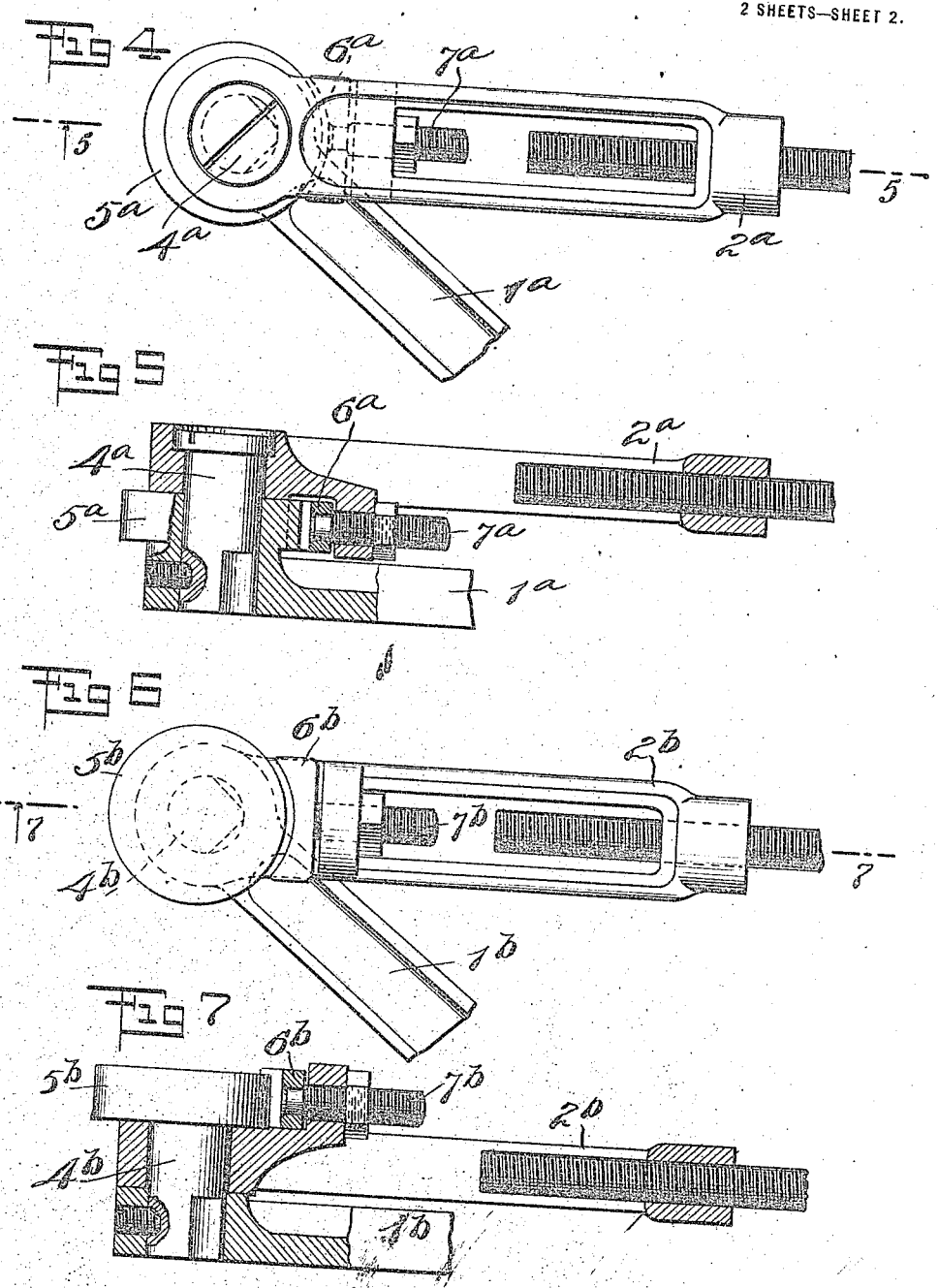

UNITED STATES PATENT OFFICE.

JOHN PETERSON, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

HOLD-OPEN DEVICE FOR DOORS.

1,170,491.  Specification of Letters Patent.  Patented Feb. 1, 1916.

Application filed October 23, 1915. Serial No. 57,412.

*To all whom it may concern:*

Be it known that I, JOHN PETERSON, a citizen of the United States of America, residing at New Britain, Connecticut, have invented a new and useful Hold-Open Device for Doors, of which the following is a specification.

My invention relates to new and useful improvements in devices for holding doors ajar and is adapted especially for association with the usual well known door checks and closers, wherein the door check and closer carries a lever arm and is usually provided with a link for connecting the outer end thereof with the door casing.

My improved device is exceedingly simple, may be cheaply made, and may be adjusted to hold the door open at any desired angle.

In the drawings: Figure 1 is a plan view of my new and improved door holder in one preferred form. Fig. 2 is an edge elevation of the parts shown at the upper end of Fig. 1. Fig. 3 is a section on the line 3—3, of Fig. 1. Fig. 4 is a plan view of another form of my invention. Fig. 5 is a section on the line 5—5, of Fig. 4. Fig. 6 is a plan view of still another form or modification. Fig. 7 is a section on the line 7—7, of Fig. 6.

Referring first to the construction shown in Figs. 1, 2 and 3, 1 represents the usual lever arm such as commonly employed on a door check and closer. 2 is the usual extensible link. Ordinarily, the door check is carried by the door to be controlled, while the end of the link 2 is connected suitably to the overhead door casing, as indicated at 3. The outer ends of the arm 1 and link 2 are pivotally connected by a suitable pivot pin 4. In this particular instance, the outer end of the arm 1 is turned back to form a slot into which the outer end of the link 2 extends. The outer end of the link 2 is flattened to form a disk-like portion 5 which is tapered as best seen in Fig. 2 to form a wedge or cam surface. The pivot pin 4 passes through the disk portion 5 to form a hinge joint.

6 is a friction shoe carried by the arm 1 and projecting into the slot adjacent to the surface of the disk portion 5. This shoe is preferably adjustable by an adjusting screw 7. Obviously, as the arms 1, 2 swing apart, a thicker portion of the disk 5 will be presented to the shoe 6 until the parts finally wedge and thereby frictionally hold the arms 1, 2 at a predetermined angle depending upon the adjustment of the screw 7. The wedging action is effected wholly independent of the pivot, and hence the latter is not subjected to undue strain.

In that form of my invention shown in Figs. 4 and 5, $1^a$ is the lever arm, $2^a$ is the link arm, $4^a$ is the pivot pin, $5^a$ is the disk, $6^a$ is the friction shoe, and $7^a$ is the adjusting screw. In this particular construction, the friction disk $5^a$ is formed on the lever arm $1^a$ instead of on the link arm $2^a$, and the shoe $6^a$ and adjusting screw $7^a$ are carried by the arm $2^a$ instead of by the lever arm $1^a$. In this case the disk $5^a$ is mounted eccentric to the axis of the pivot pin $4^a$, so that the cam or wedge action may be caused to occur at the edge of the disk $5^a$ instead of on the upper or lower surface, as in Fig. 1. These modifications embody the same principle of operation as disclosed in Fig. 1.

In the form shown in Fig. 6, $1^b$ is the lever arm, $2^b$ is the link arm, $4^b$ is the pivot pin, $5^b$ is the friction disk, $6^b$ is the friction shoe, and $7^b$ is the adjusting screw. The construction of Figs. 6 and 7 is substantially the same as construction shown in Figs. 4 and 5, save that instead of forming or mounting the friction disk directly on the lever arm, it is mounted on the top of the pivot stud $4^b$, and the shoe $6^b$ is so mounted as to properly engage the periphery of the disk $5^b$ for the purpose of securing the desired wedge action at the proper time. Here again, the friction disk $5^b$ is mounted eccentric to the axis of the pivot stud $4^b$ for the same reason as in Figs. 4 and 5.

Preferably, the friction shoes should have a limited degree of oscillating movement so as to adapt themselves to the curve or pitch of the adjacent friction surfaces with which they coact.

In all forms of the invention shown and described herein, the pivot pin or stud performs solely the function of a pivot pin, and hence possesses the maximum durability and strength.

What I claim is:

1. In a hold open device for a door, two arms, a pivot for connecting the ends of said arms, a friction shoe carried by one arm at one side of said pivot, and a friction member carried by the other arm having a cam face arranged to coöperate with said shoe when said arms are moved apart to a certain predetermined extent.

2. In a hold open device for a door, two arms, a pivot for connecting the ends of said arms, a friction shoe carried by one arm at one side of said pivot, and a friction member carried by the other arm having a cam face arranged to coöperate with said shoe when said arms are moved apart to a certain predetermined extent, and means for effecting a relative adjustment between said shoe and cam for the purpose described.

3. In a hold back device for a door, two arms, a pivot for connecting the ends of said arms, a friction shoe carried by one arm at one side of said pivot, a friction member carried by the other arm having a cam face arranged to coöperate with said shoe when said arms are moved apart to a predetermined extent, said shoe having a limited degree of movement on its support, whereby it may adapt itself to the pitch of the cam.

4. In a hold open device for a door, two arms, a pivot for connecting the ends of said arms, said pivot being carried by one of the arms, a friction head at the end of the other arm through which said pivot freely passes, said head having a cam surface, a friction shoe carried by the arm carrying the pivot and at one side of the latter and arranged to coöperate with the cam surface on the end of the other arm.

5. In a hold open device for a door, two arms, a pivot for connecting the ends of said arms, a friction head carried at the end of one of the arms and adjacent to the pivotal connection, said friction head having a cam face, a friction shoe carried by the other arm at one side of said pivot and arranged to coöperate with said cam face when said arms are swung apart to a predetermined degree to frictionally hold said arms in said position.

JOHN PETERSON.